United States Patent [19]

Furber et al.

[11] Patent Number: 5,732,278
[45] Date of Patent: Mar. 24, 1998

[54] DATA MEMORY AND PROCESSOR BUS

[75] Inventors: Stephen Byram Furber, Winslow; William Henry Oldfield, Ely, both of United Kingdom

[73] Assignee: Advanced Risc Machines Limited, Cambridge, United Kingdom

[21] Appl. No.: 589,180

[22] Filed: Jan. 19, 1996

Related U.S. Application Data

[63] Continuation of Ser. No. 308,752, Sep. 19, 1994, abandoned.

[30] Foreign Application Priority Data

Jan. 11, 1994 [GB] United Kingdom ............... 9400381

[51] Int. Cl.$^6$ ............................................. G06F 15/00
[52] U.S. Cl. ................. 395/800; 395/458; 395/421.01
[58] Field of Search ............................. 395/800, 375, 395/458, 421.01

[56] References Cited

U.S. PATENT DOCUMENTS 4,623,990  11/1986  Allen et al. ............... 365/189.04
5,086,407  2/1992  McGarity et al. ............... 395/800
5,325,499  6/1994  Kummer et al. ............... 395/470

FOREIGN PATENT DOCUMENTS 0 464 708 A1  6/1990  European Pat. Off. ........ G06F 15/16

Primary Examiner—Alyssa H. Bowler
Assistant Examiner—John Follansbee
Attorney, Agent, or Firm—Fenwick & West LLP

[57] ABSTRACT

A data processing system has a CPU linked via a unidirectional read bus and a unidirectional write and address bus to a data memory (e.g., cache, RAM, or disk), in the form of a cache memory. Since the read bus and the write and address bus are only driven in one direction, lost time through reversing the direction of signals travel along a bus is avoided. Read-data words and instruction-data words are transferred from the cache memory to a core of the CPU via the read bus. Instruction-address, read-address, write-address, and write-data words are time division multiplexed on the write and address bus to pass from the core to the cache memory. The system supports burst mode transfer thereby reducing the number of addresses that need to be transferred on the write and address bus thereby releasing bandwidth on this bus for use by write-data words.

5 Claims, 8 Drawing Sheets

DATA MEMORY AND PROCESSOR BUS

RELATED APPLICATIONS

This is a continuation of U.S. patent application Ser. No. 08/308,752 filed on Sep. 19, 1994 now abandoned.

BACKGROUND OF THE INVENTION

1. Field of the Invention

This invention relates to the field of data processing. More particularly, this invention relates to data processing systems having a processor and a data memory between which instruction-data words, read-data words and write-data words are to be transferred.

2. Description of the Prior Art

It is known to provide data processing systems having a processor coupled to a data memory, such as a cache memory, where the data memory stores instruction-data words, read-data words and write-data words. It will be appreciated by those skilled in the art, that the distinction between the different data words depends upon the access operation one is currently performing with that data word, e.g. a data word one is writing to the data memory can be considered a write-data word at that time and that same data word subsequently being read from the data memory can be considered to be a read-data word.

The transfer of data words between a data memory and an associated processor is often a performance critical factor in the operation of such a data processing system. In order to improve the overall performance of the system, considerable effort is expended in the design of the mechanism for transferring such data words.

FIGS. 1 to 4 of the accompanying drawings illustrate a typical arrangement (similar to the ARM600 integrated circuit of Advanced RISC Machines Limited) for transferring data between a central processing unit 2 (CPU) and a cache memory 4. The system has a data bus 6 and an address bus 8 extending between the CPU 2 and the cache memory 4. The CPU 2 includes a core 10 which is responsive to instruction-data words supplied to it via an instruction-data word bus 12. The core 10 outputs write data words (WD) via driver 30 onto the data bus 6 and write addresses (WA) on to a read and write address bus 14. The write address WA, when received by the cache memory 4, controls the location where the write-data word WD is stored within the cache memory 4. In an analogous manner, the data bus 6 and the read and write address bus 14 can be used to read read-data words (RD) from the cache memory 4 into the core 10 from locations within the cache memory 4 specified by a read address (RA) on the read and write address bus 14.

Instruction-data words to be recovered from the cache memory 4 are passed via the data bus 6 to a prefetch unit 16 (the ARM600 does not have a prefetch unit, although some other processors of this class do have a prefetch unit). The prefetch unit 16 is intended to aid the smooth feeding of instruction-data words to the core 10 in a timely manner and perform functions such as branch instruction identification. The addresses within the cache memory 4 from which the instruction-data words are recovered is specified by a program counter address (PC) generated by the core 10 and passed via a program counter bus 18, the prefetch unit 16 and a multiplexer 20 to the address bus 8. The multiplexer 20 serves to selectively couple either the program counter bus 18 or the read and write address bus 14 to the address bus 8 in dependence upon an instruction not data flag signal (I/D) generated by the core 10.

An alternative would be for the prefetch unit 16 to contain the program counter register PC and pass the program counter value back to the core 10 together with the associated instruction. The prefetch unit 16 would thus be responsible for most prefetching and would be required to drive an address flag AF. The core 10 could retain the capability of updating the prefetch unit program unit value to effectively control its own prefetching.

Within the cache memory 4, an array of storage cells 22 is provided within which the instruction-data words, the read-data words and the write-data words are stored. The address bus 8 is supplied to an address decoder 24 which serves to select an individual storage cell or row of storage cells from within the array of storage cells 22 in dependence upon the address word read from the address bus 8. Read-data words to be recovered from the cache 4 are supplied via a read data bus 26 to the data bus 6. Write-data words to be stored within the cache 4 ape coupled from the data bus 6 via a write data bus 28 to the array of storage cells 22.

In order to load data into the cache other than through the core 10 requires another mechanism. This mechanism would require its own drivers to force the signal lines to the appropriate values. Such a mechanism would, for example, operate upon a cache miss. This mechanism would typically operate at a much slower rate than the core 10, but is not so critical to system performance.

An important consideration within the design of such system as illustrated in FIG. 1, is that the data bus 6 and the address bus 8 tend to have long track lengths and so relatively high associated capacitances. In order to core with this, words to be placed upon these buses must be actively driven onto the buses so as to speed the time taken for the individual bus lines to reach the correct signal level values. To this end, a driver circuit 30 within the CPU 2 drives write-data words onto the data bus 6. In an analogous manner, a driver circuit 32 within the cache 4 drives read-data words onto the data bus 6. It will be appreciated that only one of these two drivers for the data bus 6 should be active at any one time. A read flag signal (R) and a write flag signal (W) generated by the core 10 serve to activate and de-activate these two drivers 30, 32. A driver 34 within the CPU 2 serves to drive address words onto the address bus 8.

FIG. 2 illustrates the operation of the system of FIG. 1 when fetching instruction-data words. In this mode, the multiplexer 20 switches the PC value onto the address bus 8 to select the instruction address location from within the cache memory 4. The instruction-data word I accessed in this way is passed to the core 10 via the read bus 26, the driver 32, the data bus 6, the prefetch unit 16 and the instruction bus 12.

FIG. 3 illustrates the operation of the system of FIG. 1 in transferring read-data words. In this case, the multiplexer 20 selects a read address RA from the core 10 for supply via the address bus 8 to the address decoder 24. The read-data word thus accessed is passed back to the core 10 via the read bus 26, the driver 32 and the data bus 6.

Finally, FIG. 4 illustrates the operation of the system of FIG. 1 in transferring a write-data word. In this case, a write address WA is passed from the core 10 via the multiplexer 20 to the address bus 8. One cycle later, the core 10 generates a write-data word WD and passes this via the driver 50, the data bus 6 and the write bus 28 to the array of storage cells 22.

It will be noticed that during transfer of a read-data word, the driver 32 within the cache memory 4 drives the data bus 6. Conversely, during transfer of a write-data word, the driver 30 within the CPU 2 drives the data bus 6. In order to avoid any conflicts between the two drivers 30, 52, it is important that they should never attempt to drive the data bus 6 simultaneously. Such a conflict may result in damage to the circuit and will consume a disadvantageously large amount of power. In order to be certain of avoiding such conflicts, a delay period has to be allowed between switching off one of the drivers 30, 32 and switching on the other of the drivers 30, 32. This requires two separate control signals or careful timing design in the buffers (i.e. slow turn-on and fast turn-off).

In order to increase the overall performance of systems such as that illustrated in FIGS. 1 to 4, various approaches may be adopted. One approach is to increase the clock speed with which data is transferred, e.g. if a clock frequency of f is used for the core 10, then a clock speed of 2 f could be used for the transfers. However, with such an approach problems arise in maintaining and adequately synchronising a sufficient delay between the driving of the data bus 6 with the driver 30 and the driving of the data bus 6 with the driver 32. In addition, there is a loss of bandwidth due to the synchronisation requirements.

Another approach to increasing performance might be simply to increase the bus widths. Wider buses allow more data to be transferred in a given time at a given clock speed. This approach suffers from the disadvantage that it increases the physical size of the buses. In many circumstances, an increase in physical size is disadvantageous from a manufacturing point of view since larger integrated circuits with consequent lower yields are required.

SUMMARY OF THE INVENTION

An object of the invention is to address the abovementioned problems.

Viewed from one aspect this invention provides apparatus for processing data, said apparatus comprising:

(i) a data memory;

(ii) a processor, responsive to instruction-data words read from instruction addresses in said data memory, to read read-data words from read addresses in said data memory and to write write-data words to write addresses in said data memory;

(iii) a unidirectional read bus between said data memory and said processor for transferring instruction-data words and read-data words from said data memory to said processor; and (iv) a unidirectional write and address bus between said processor and said data memory for transferring write-data words, instruction-address words, read-address words and write-address words from said processor to said data memory.

Providing unidirectional buses for data flow in either direction has the advantage that a time gap necessary for the safe reversing of bus direction need not be provided. Thus, bus speeds can be increased without causing synchronization problems. Furthermore, the invention exploits the realisation that address data passed via the address bus changes relatively infrequently compared with the data on the data bus. Thus, multiplexing write data onto this bus with the address data to form a write and address bus takes fuller advantage of the bandwidth available.

It will be appreciated that the data memory could take a number of forms, e.g. a RAM or even a magnetic storage device. However, the invention is particularly suited for applications in which the data memory is a cache data memory. Such cache data memory applications are particularly speed-critical.

As previously discussed, driver circuits can be provided for the data buses to increase the speed with which signal values are reliably obtained. Whilst the invention has the advantage of making increased use of the bandwidth of the bus passing the address data even without such drivers, such drivers are well suited for use with the invention since they can remain permanently active for a given bus.

In preferred embodiments of the invention said processor comprises an instruction prefetch unit for receiving said instruction-data words and a read-data word receiving circuit for receiving said read data words, said instruction prefetch unit and said read-data word receiving circuit being connected in parallel to said read data bus.

The provision of a prefetch unit speeds the operation of instruction processing. The parallel connection of the read-data word receiving circuit and the prefetch unit allows the read bus to pass either instruction-data words or read-data words without having to route via a multiplexer, the processor selectively activating either the prefetch unit or the read-data word receiving circuit as appropriate.

In preferred embodiments of the invention said data memory comprises an address receiver and decoder for receiving and decoding said instruction-address words, said read-address words and said write-address words and a write circuit for writing said write-data words, and wherein an address flag signal line runs between said processor and said address receiver and decoder for activating said address receiver and decoder.

The multiplexing of address-data words and write-data words onto the address bus raises the problem of how this different data can be identified and processed accordingly by the data memory. To this end, advantageous flexibility is achieved by providing an address flag signal in order to control the appropriate processing within the data memory.

In an complementary manner, it is preferred that said processor comprises a processor multiplexer for selecting either instruction-address words or read-address words and write-address words or write-data words for connection to said write and address bus.

In this way, a mechanism is provided for placing the appropriate data onto the write and address data bus.

Data can be recovered from a data memory in a number of different ways. An address can be provided for each data word to be recovered. However, in preferred embodiments of this invention said data memory is operable in a burst access mode whereby an address word transferred to said data memory specifies a start address for a sequence of access operations for consecutive addresses within said data memory.

Such burst mode access is particularly suited to the invention since an address-data word need only be provided at the start of a sequence of instruction-data words or read-data words to be recovered or write-data words to be written. A single address-data word starts the access process which then proceeds sequentially through the following addresses until terminated. In this way, the write and address data bus is required to carry fewer address-data words so releasing bandwidth for the passing of write-data words.

A preferred manner of controlling the operation of the data memory is to provide a read flag signal line running between said processor and said data memory for transferring a read flag signal, a write flag signal line running between said processor and said data memory for transferring a write flag signal and an instruction flag signal line running between said processor and said data memory for transferring an instruction flag signal, wherein said read flag signal, said write flag signal and said instruction signal select an access mode to said data memory and said read flag serves to override said instruction flag signal such that transfer of a read-data word over said read bus has higher priority than transfer of an instruction-data word.

In this way, the data memory can be placed in the appropriate mode for recovering read-data words or instruction-data words or storing write-data words. Furthermore, average processing speed is improved by providing the transfer of a read-data word to have a higher priority than that of an instruction-data word since instruction-data words are typically prefetched and buffered within a system, whereas, the recovery of read-data words tends to occur spasmodically as individual decoded instructions so require.

Viewed from another aspect this invention provides a method of processing data, said method comprising the steps of:

(i) storing instruction-data words, read-data words and write-data words in a data memory;

(ii) transferring instruction-data words and read-data words from said data memory to a processor via a unidirectional read bus between said data memory and said processor; and (iii) transferring write-data words, instruction-address words, read-address words and write-address words from said processor to said data memory via a unidirectional write and address bus between said processor and said data memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
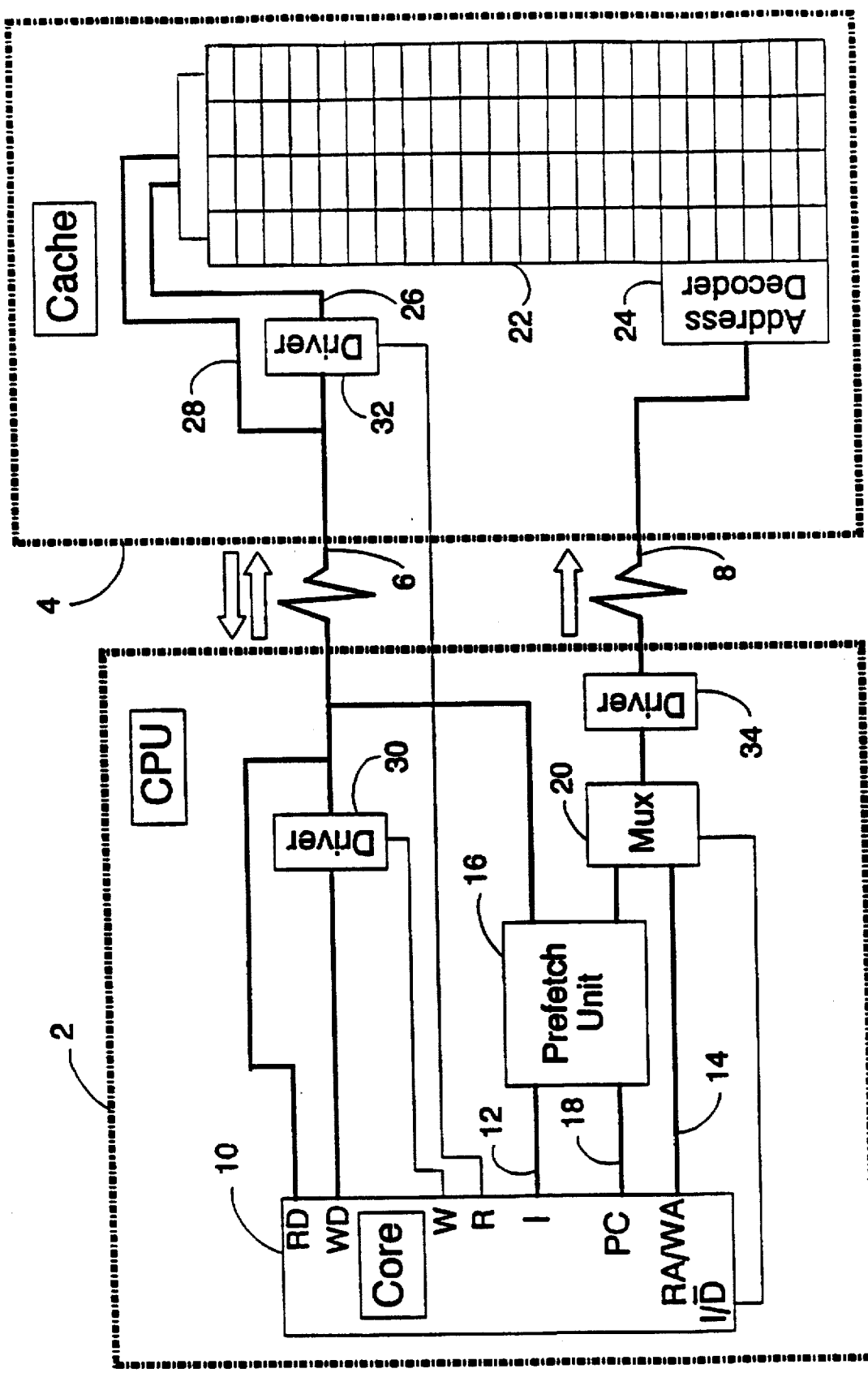
FIGS. 1 to 4 illustrate a typical known processor and data memory system.
Figure 2:
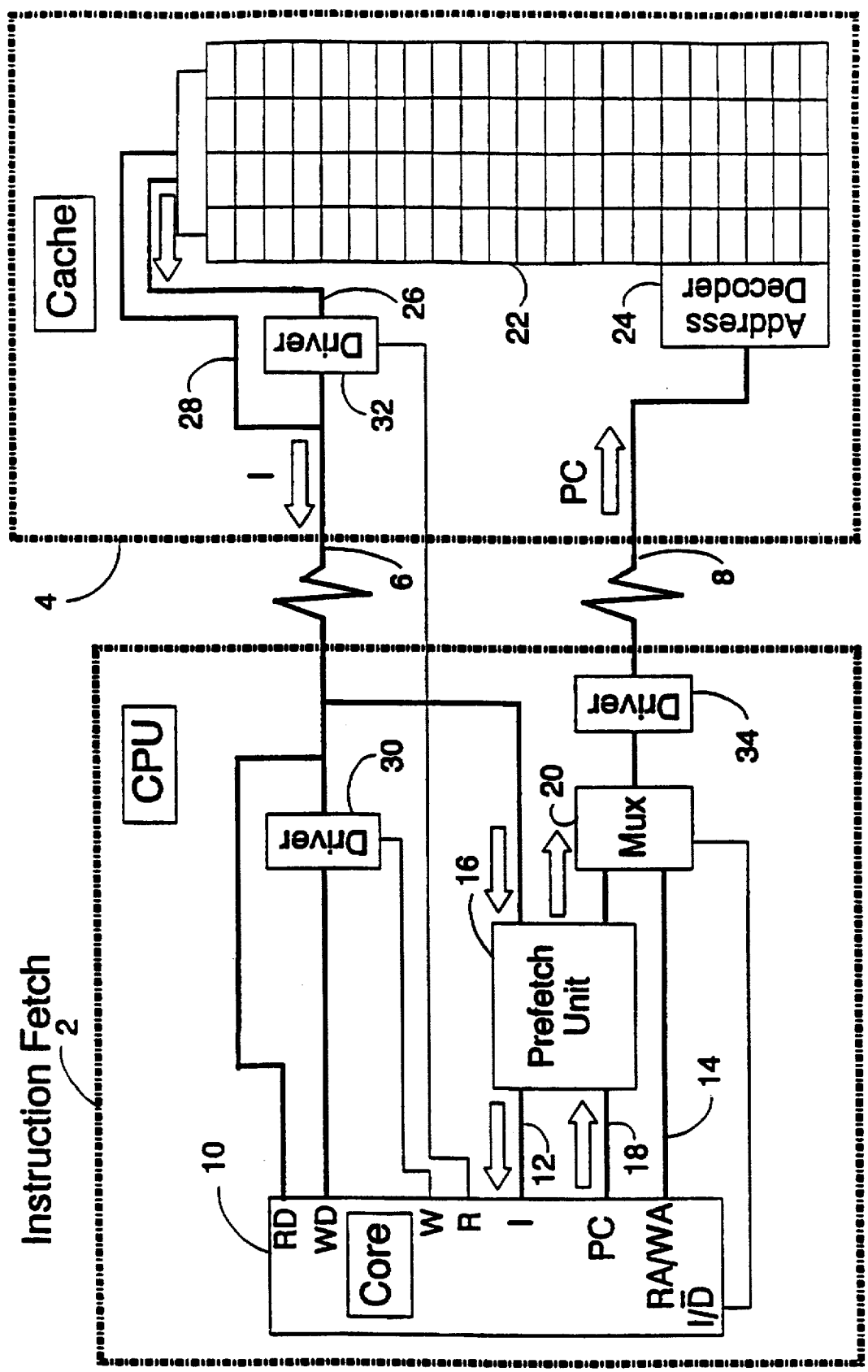
Figure 3:
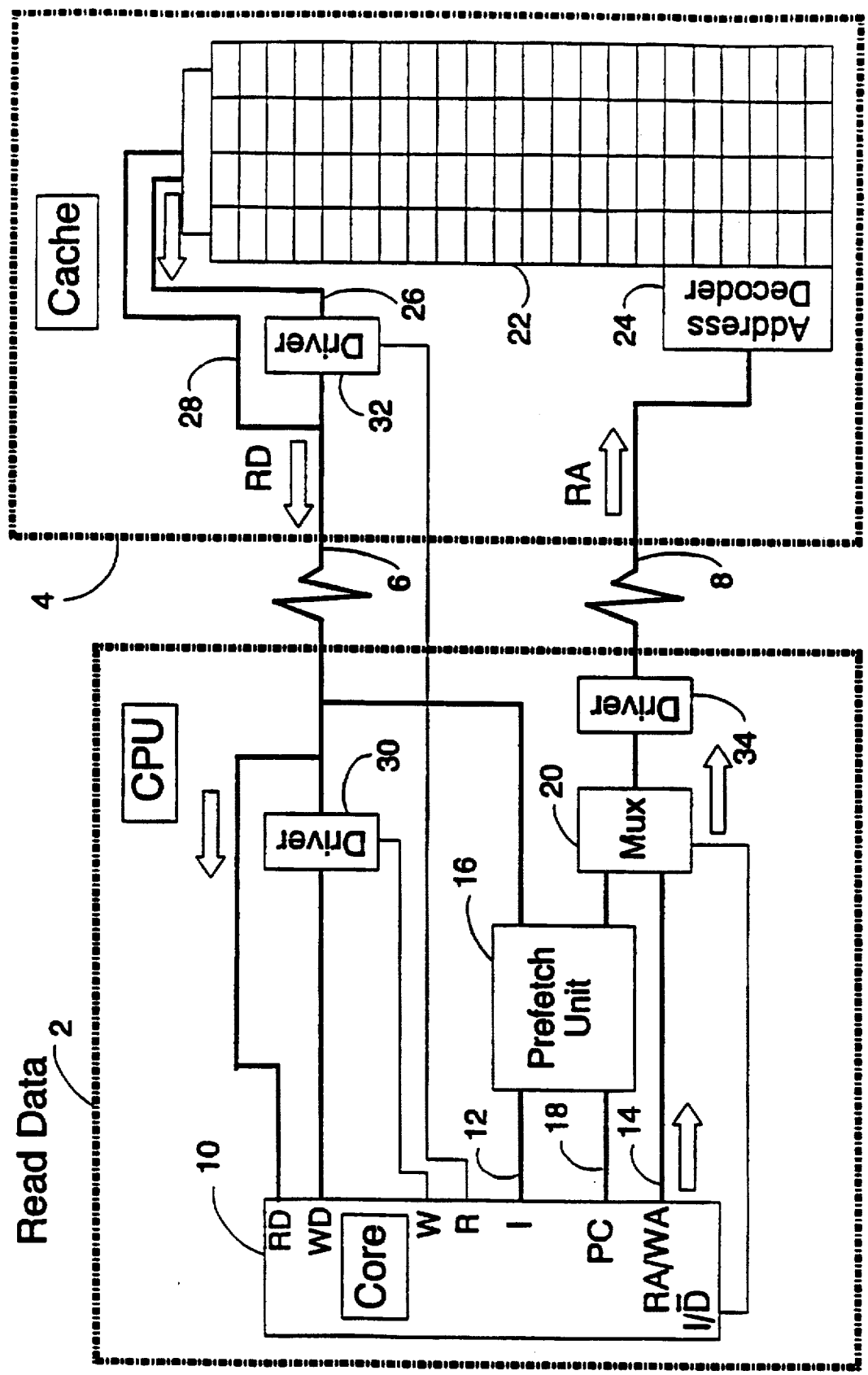
Figure 4:
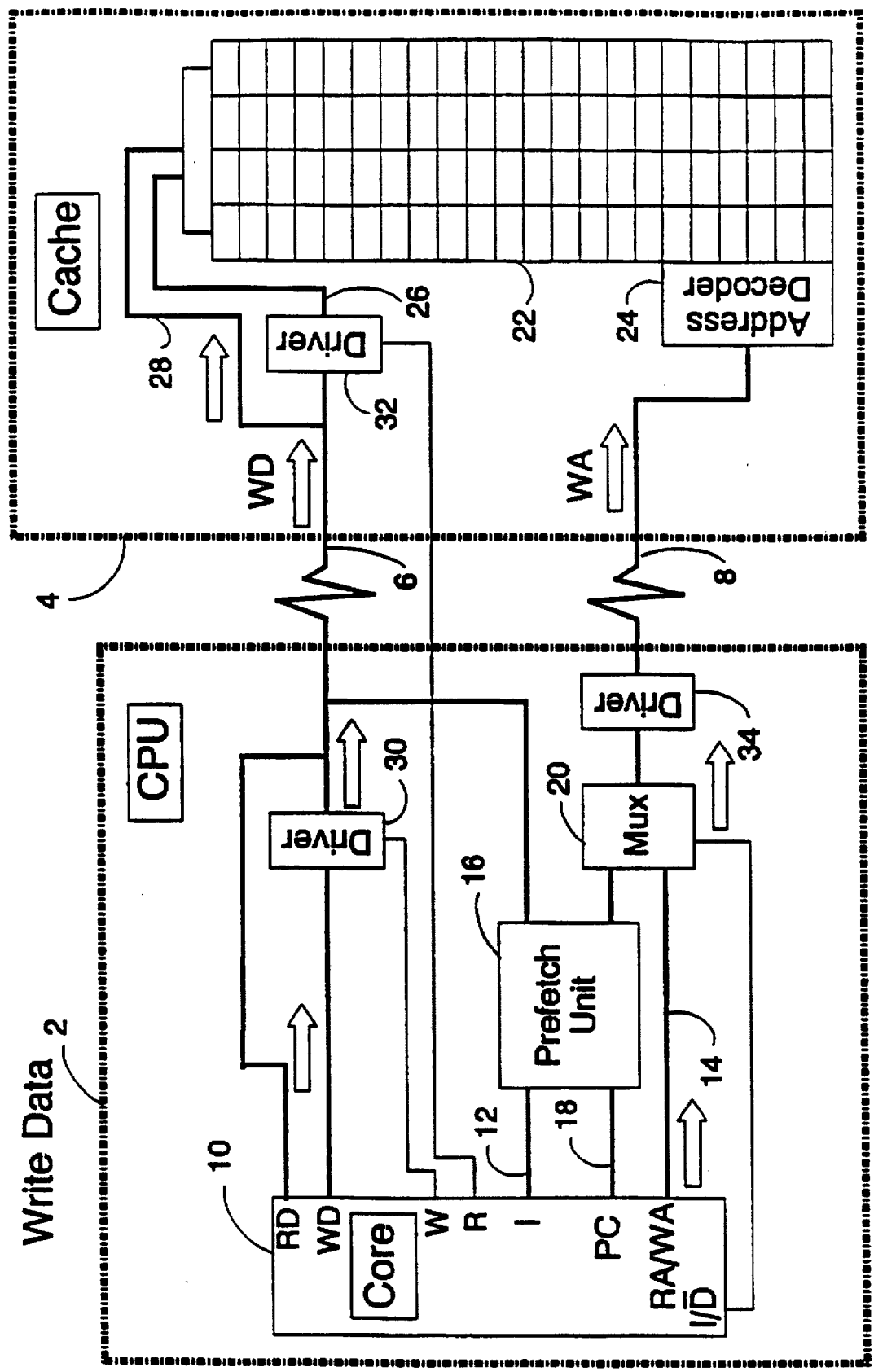
Figure 5:
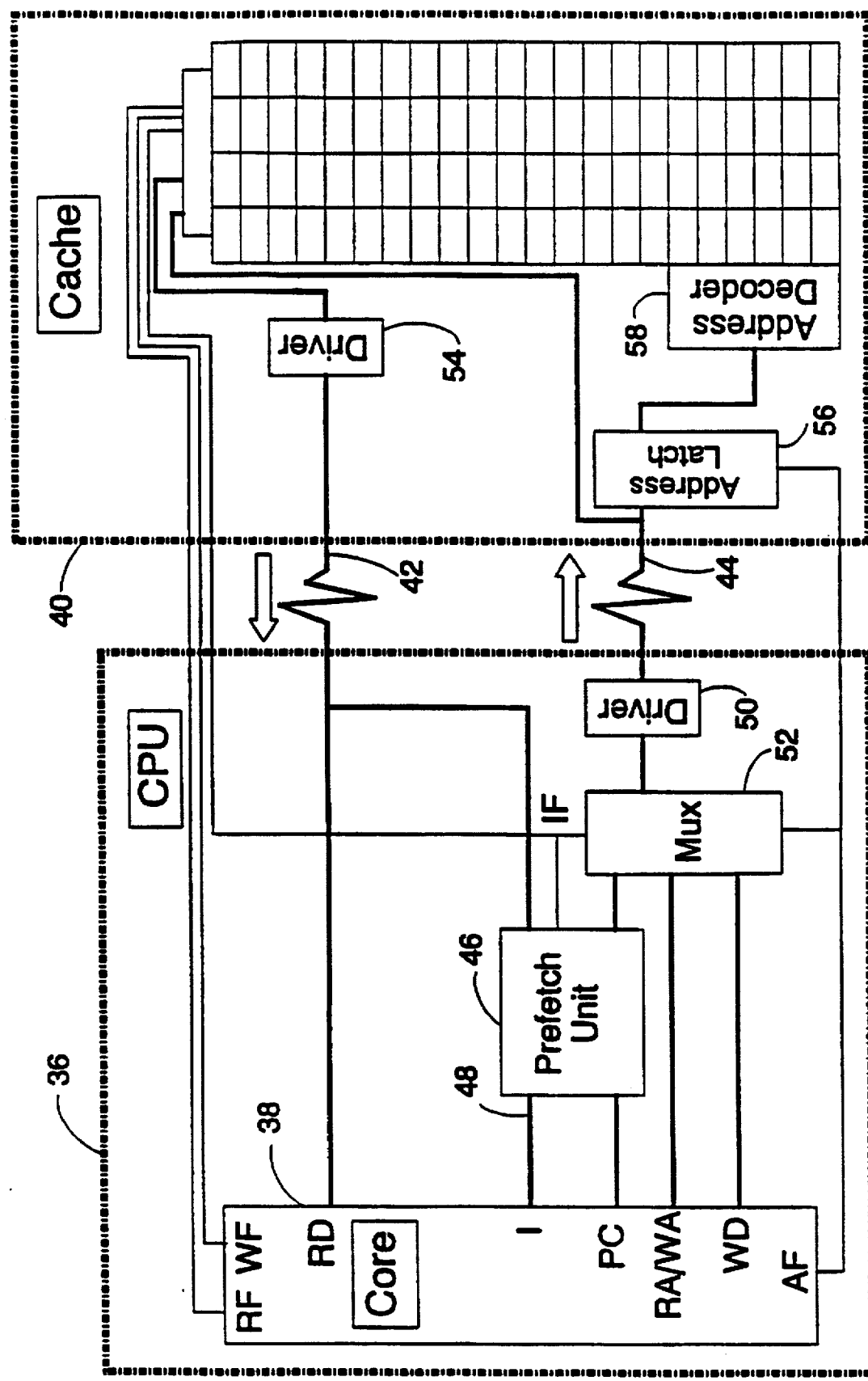
FIG. 5 illustrates the arrangement of a processor and data memory system having unidirectional buses in accordance with one embodiment of this invention.

FIG. 5 shows a CPU 36 having a core 38 that receives read-data words RD and instruction-data words I and generates write-data words WD. These data words are transferred between the CPU 36 and a cache memory 40 via a unidirectional read bus 42 and a unidirectional write and address bus 44. The read bus 42 is connected in parallel to a prefetch unit 46 and a read data receiving circuit within the core 38. Instruction-data words from the prefetch unit 46 are passed to the core 38 via an instruction bus 48.

The write and address bus 44 is driven by a driver 50 within the CPU 36, the driver 50 receiving its input from a three-way multiplexer 52. The three-way multiplexer 52 selects from among a program counter value PC from the prefetch unit 46, a read address RA or write address WA from the core 38 or write data WD from the core 38. The signal selected by the three-way multiplexer 52 is selected in dependence upon an address flag signal AF generated by the core 38 and an instruction flag signal IF generated by the prefetch unit 46.

Within the cache memory 40, a driver 54 serves to drive signal values onto the read data bus 42. Signals from the write and address bus 44 are directed to both an address decoder circuit 58 (via an address latch 56 controlled by the address flag signal AF) and a write data receiving circuit.

It will be appreciated by that, whilst the above described embodiment uses an address decoder circuit 58, embodiments based upon an associative cache (i.e. decode-TAG lookup) are also possible.

The recovery of either read-data words or instruction-data words by the cache memory 40 is controlled via a read flag signal RF generated by the core 38 and the instruction flag signal IF. Furthermore, a write flag signal WF generated by the core 38 serves to indicate that write-data words should be received and stored by the cache memory 40 from the write and address bus 44.

In the circuit of FIG. 5, as contrasted with the circuits of FIGS. 1 to 4, the read bus 42 is unidirectional with a driver 54 provided only at one end, this bus having no need to reverse its direction of transfer. Accordingly, no time is wasted in such reversals and the potential damage and power wastage due to driver circuit conflicts is avoided. The address data and write data is time division multiplexed onto the write and address bus 44 by the three-way multiplexer 52.

Figure 6:
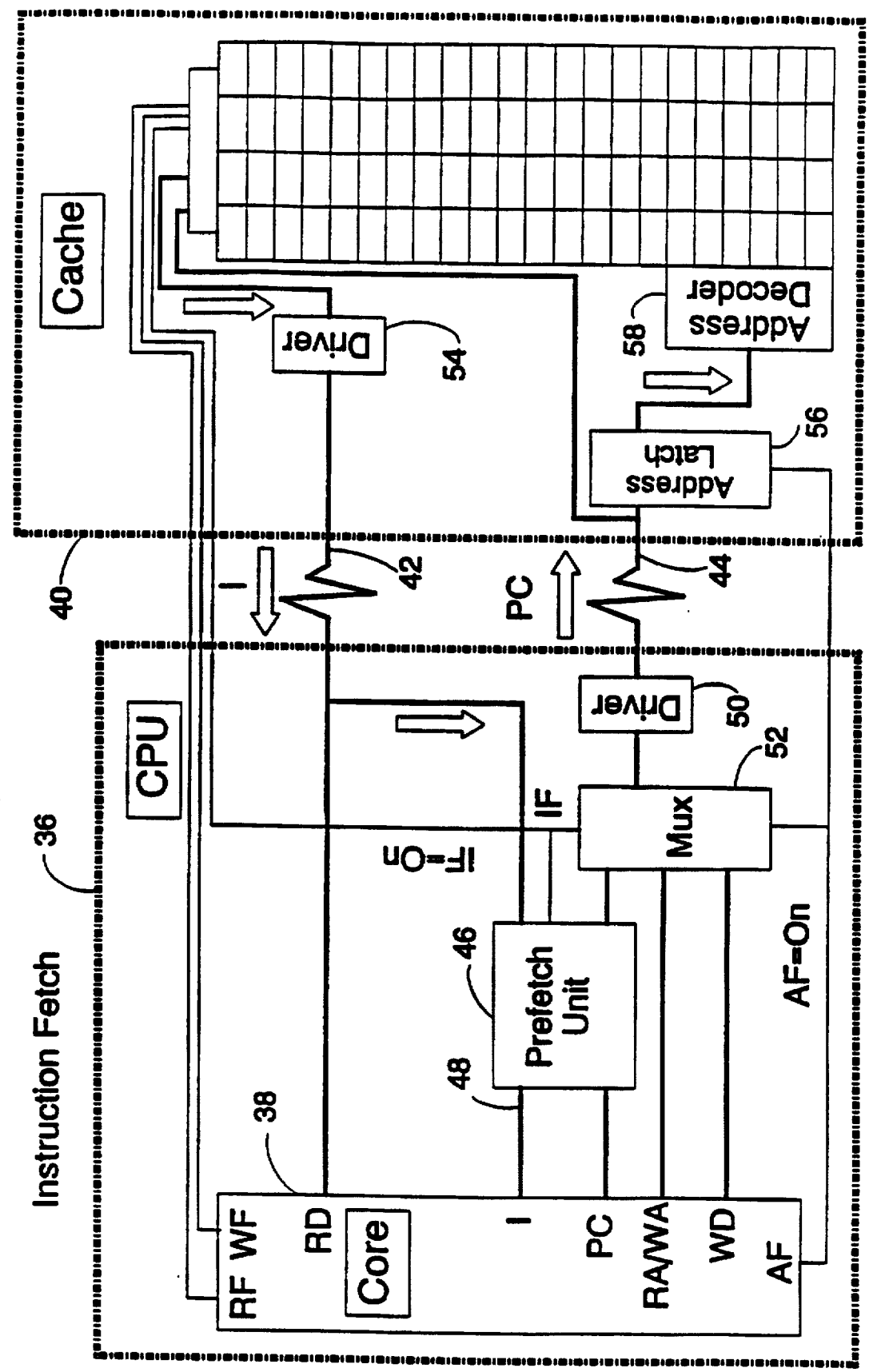
FIGS. 6 to 8 illustrate the operation of the embodiment of FIG. 5 in different modes.

FIG. 6 illustrates the system operating in an instruction fetch mode. In this mode, the program counter address value PC is passed to the address decoder 58 via the prefetch unit 46, the three-way multiplexer 52, the driver 50, the write and address bus 44 and the address latch 56. The address flag signal AF is ON and the instruction flag signal IF is ON. This combination of signals controls the three-way multiplexer 52 to select the program counter address value PC from the prefetch unit 46 for application via the driver 50 to the write and address bus 44. The instruction flag IF passing to the cache memory 40 also indicates that an instruction-data word should be recovered from the address specified on the write and address bus 44. This instruction-data word is returned to the CPU 36 via the driver 54, the read bus 42, the prefetch unit 46 and the instruction bus 48.

The system operates in a burst mode whereby a single start program counter address value PC specifies an address from which sequential instruction fetches precede until a further address is supplied. The address latch 56 holds the input to the address decoder circuit 58, the address decoder circuit 58 incorporating a counter to increment the address during burst mode operation.

Figure 7:
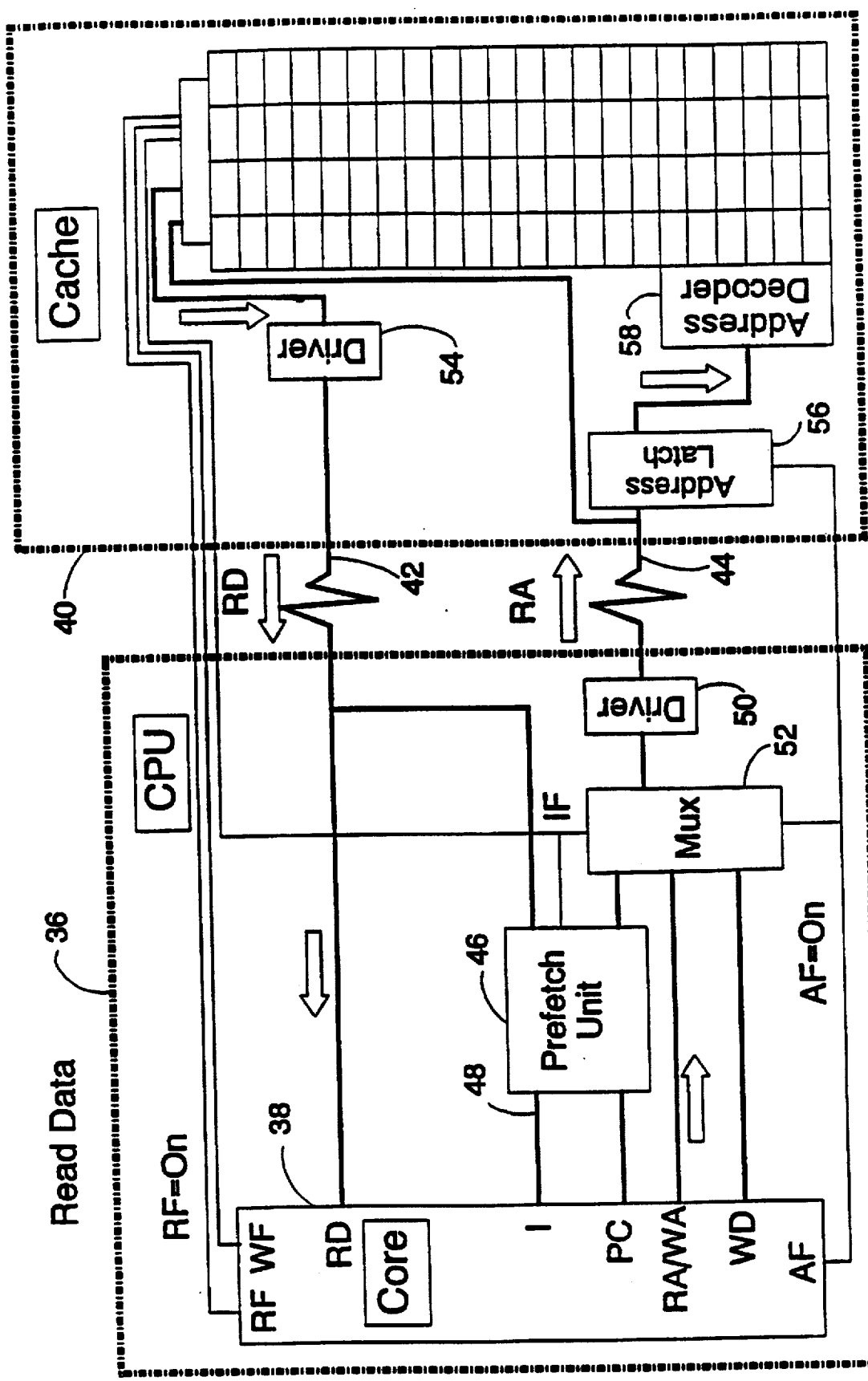

FIG. 7 illustrates a data read operation for the system of FIG. 5. In this case, read-data words are routed from the cache memory 40 to the core 38 via the driver 54 and the read-data bus 42. The read address RA is selected by the three-way multiplexer 52 in response to the address flag signal AF being asserted ON and the instruction flag IF being asserted OFF. Accordingly, the read address is applied to the cache 40 via the driver 50, the write and address bus 44, the address latch 56 and the address decoder 58. The address flag being ON, the read flag being ON and the write flag being OFF causes the cache 40 to treat the signals on the write and address bus 44 as a read address.

A read data operation takes priority over an instruction fetch operation. Thus, if the prefetch unit 46 is asserting the instruction flag signal IF ON, indicating that it is ready to receive more instruction-data words, and the core 38 asserts the read flag signal RF ON, then logic within the cache memory 40 takes the read operation as having the higher priority and returns the requested read-data words via the read bus 42 rather than any instruction-data words.

Figure 8:
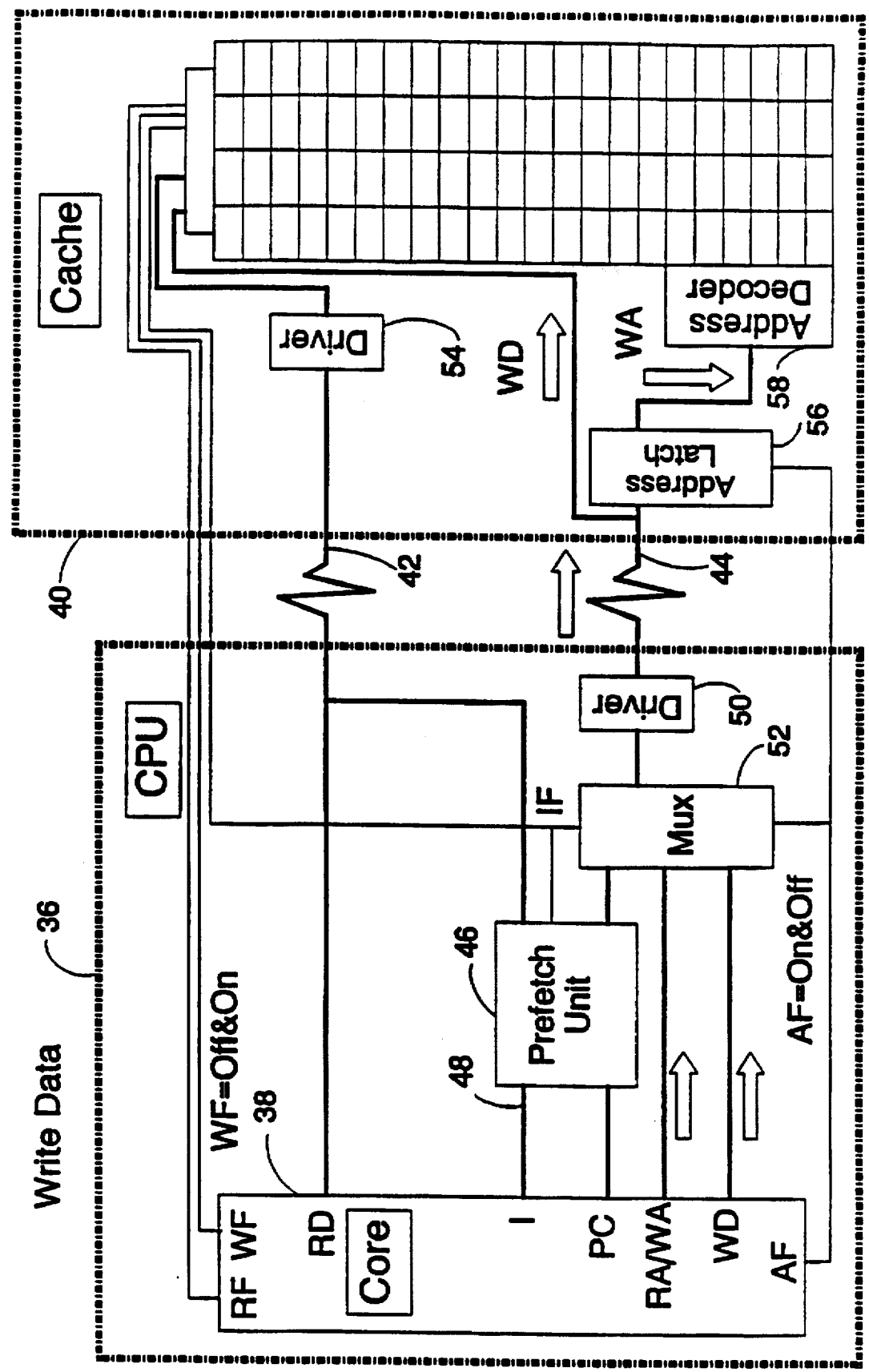

FIG. 8 illustrates the system of FIG. 5 in a mode storing write-data words in the cache memory 40. During this mode, the address flag signal AF alternates between being asserted ON and OFF depending upon whether a write-address WA or a write-data word WD is currently being output by the core 38. The instruction flag signal IF is asserted OFF and the address flag signal AF serves to control the three-way multiplexer 52 to select the appropriate write-address WA of write-data word and apply this to the write and address bus 44 via the driver 50. The write-data words and write-address words are thus effectively time division multiplexed onto the write and address bus 44. The provision of a burst mode write transfer has the result that a write address need only be provided at infrequent intervals, e.g. at page boundaries. If a write address had to be provided for each write data word, then this would effectively halve the write data bandwidth.

Within the cache memory 40, the address latch 56 responds to the value of the address flag signal AF to capture address words on the write and address bus 44. The write flag signal WF is asserted OFF and ON (in anti-phase to the address flag AF) indicating to the cache 40 that write data words from the write and address bus 44 are to be stored.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:

a cache data memory;

a processor, responsive to instruction-data words read from instruction addresses in said cache data memory, to read read-data words from read addresses in said cache data memory and to write write-data words to write addresses in said cache data memory, said processor including an instruction prefetch unit for receiving said instruction-data words and a processor core for executing said instruction-data words;

a undirectional read bus directly connecting said cache data memory and said processor for transferring said instruction-data words and said read-data words from said cache data memory to said processor;

a unidirectional write and address bus directly connecting said processor and said cache data memory for transferring said write-data words, instruction-address words, read-address words and write-address words from said processor to said cache data memory;

a read flag signal line running between said processor core and said cache data memory for transferring a read flag signal;

a write flag signal line running between said processor core and said cache data memory for transferring a write flag signal; and an instruction flag signal line running between said instruction prefetch unit and said cache data memory for transferring an instruction flag signal;

wherein said cache data memory is operable in a burst access mode whereby a write address word or a read address word or an instruction address word transferred to said data memory specifices a start address for a sequence of access operations for consecutive addresses within said cache data memory; said cache data memory comprises a single read bus driver circuit for driving signal values to be transferred on said unidirectional read data bus;

said processor comprises a single write and address bus driver circuit for driving signal values to be transferred on said unidirectional write and address data bits; and said read flag signal, said write flag signal and said instruction flag signal select an access mode to said cache data memory and said read flag signal generated by said processor core serves to override said instruction flag signal generated by said instruction prefetch unit such that transfer of said read-data word over said unidirectional read bus has higher priority than transfer of said instruction-data word.

2. The integrated circuit of claim 1, wherein said processor comprises:

a read-data word receiving circuit for receiving said read data words, said instruction prefetch unit and said read-data word receiving circuit being connected in parallel to said unidirectional read data bus.

3. The integrated circuit of claim 1, wherein said cache data memory comprises:

an address receiver and decoder for receiving and decoding said instruction-address words, said read-address words, and said write-address words; and a write circuit for writing said write-data words;

wherein an address flag signal line runs between said processor and said address receiver and decoder for activating said address receiver and decoder.

4. The integrated circuit of claim 1, wherein said processor comprises:

a processor multiplexer for selecting one of said instruction-address words, said read-address words and said write-address words, and said write-data words for connection to said unidirectional write and address bus.

5. A method of processing data within an integrated circuit, said method comprising the steps of:

storing instruction-data words, read-data words and write-data words in a cache data memory;

transferring said instruction-data words and read-data words from said cache data memory to a processor via a unidirectional read bus directly connecting said cache data memory and said processor using a single read bus driver circuit, said processor including an instruction prefetch unit for receiving said instruction-data words and a processor core for executing said instruction-data words;

transferring said write-data words, instruction-address words, read-address words, and write-address words from said processor to said cache data memory via a unidirectional write and address bus directly connecting said processor and said cache data memory using a single write and address bus driver circuit; and transferring a read flag signal between said processor core and said cache data memory via a read flag signal line;

transferring a write flag signal between said processor core and said cache data memory via a write flag signal line; and transferring an instruction flag signal between said instruction prefetch unit and said cache data memory via an instruction flag signal line;

wherein said cache data memory is operable in a burst access mode whereby one of a write address word, a read address word, and an instruction address word transferred to said cache data memory specifies a start address for a sequence of access operations for consecutive addresses within said cache data memory; and said read flag signal, said write flag signal and said instruction flag signal select an access mode to said cache data memory and said read flag signal generated by said processor core serves to override said instruction flag signal generated by said instruction prefetch unit such that transfer of said read-data word over said unidirectional read bus has higher priority than transfer of said instruction-data word.

* * * * *